Nov. 9, 1971 ETSUZO MOHRI ET AL 3,618,406

UHF TUNER

Filed Aug. 12, 1970 2 Sheets-Sheet 1

E. MOHRI AND

T. HAYAKAWA

INVENTORS

BY Stevens, Davis, Miller & Mosher

ATTORNEYS

Nov. 9, 1971 ETSUZO MOHRI ET AL 3,618,406

UHF TUNER

Filed Aug. 12, 1970 2 Sheets-Sheet 2

United States Patent Office 3,618,406
Patented Nov. 9, 1971

3,618,406
UHF TUNER

Etsuzo Mohri, Osaka, and Toshio Hayakawa, Kadoma, Japan, assignors to Matsushita Electric Industrial Co., Ltd., Osaka, Japan Filed Aug. 12, 1970, Ser. No. 63,118
Claims priority, application Japan, Aug. 14, 1969, 44/64,606
Int. Cl. F16h *35/18*
U.S. Cl. 74—10.54 2 Claims

ABSTRACT OF THE DISCLOSURE

A UHF tuner comprising a main switch-over shaft to switch channels, a disk secured to the main switch-over shaft and formed with radially spaced peripheral notches or indentations, against which a ball is forced as the main switch-over shaft is rotated, a member coupled with a rotor shaft, coupling members integrally having gears and pins eccentric with respect to said gears, and a fine adjustment sleeve mounted on the main switch-over shaft and provided at one end with a gear, wherein the coupling members are inserted through respective openings formed in the disk, the eccentric pins of the coupling members extend within respective openings formed in the member, and the gears of the coupling members mesh with the gear of the fine adjustment sleeve.

This invention relates to UHF tuners to switch UHF-band television channels and, more particularly, to a UHF tuner having a novel telescoped coaxial arrangement of a main switch-over shaft and a fine adjustment sleeve, in which the selection of a desired channel is effected by the main switch-over shaft and the subsequent fine adjustment may be readily achieved by the manipulation of the fine adjustment sleeve.

In recent days, UHF-band television channels have been utilized in place of the VHF-band channels. The prior art UHF tuners, however, are complicated in construction and large in size. Although such UHF tuners may be justified for delux color television sets, they are too expensive and too bulky for low-priced, small-size television sets. Accordingly, there is a demand for a UHF tuner, which is small in size and simple in construction.

An object of the present invention is to provide a UHF tuner comprising a switch-over shaft, a disk secured to the main switch-over shaft, a member coupled with a rotor shaft, coupling means integrally having gears and pins eccentric with respect to the gears, and a fine adjustment sleeve mounted on the main switch-over shaft and provided with a gear, wherein the coupling means are inserted through respective openings formed in the disk, the pins of the coupling means extend within respective openings formed in said member, and the gears of the coupling means mesh with the gear of the fine adjustment sleeve.

In the UHF tuner according to the invention, the mechanism for transmitting torque from the main switch-over shaft to the rotor shaft and the mechanism for transmitting torque from the fine adjustment sleeve to the rotor shaft are simple in construction and very small in size, so that the construction of the tuner itself is very compact.

The invention will now be described in conjunction with a preferred embodiment thereof with reference to the accompanying drawings, in which.

Figure 1:
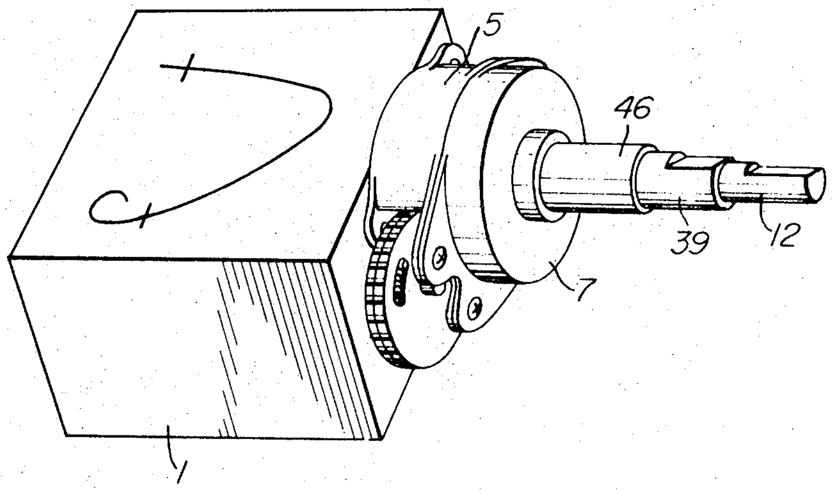
FIG. 1 is a perspective view of a UHF tuner embodying the invention.
Figure 2:
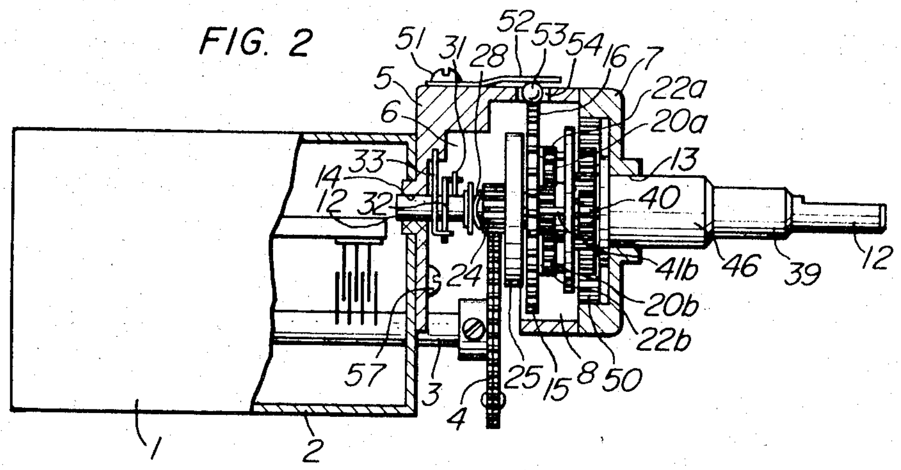
FIG. 2 is a side view, substantially in section, showing the tuner of FIG. 1.
Figure 3:
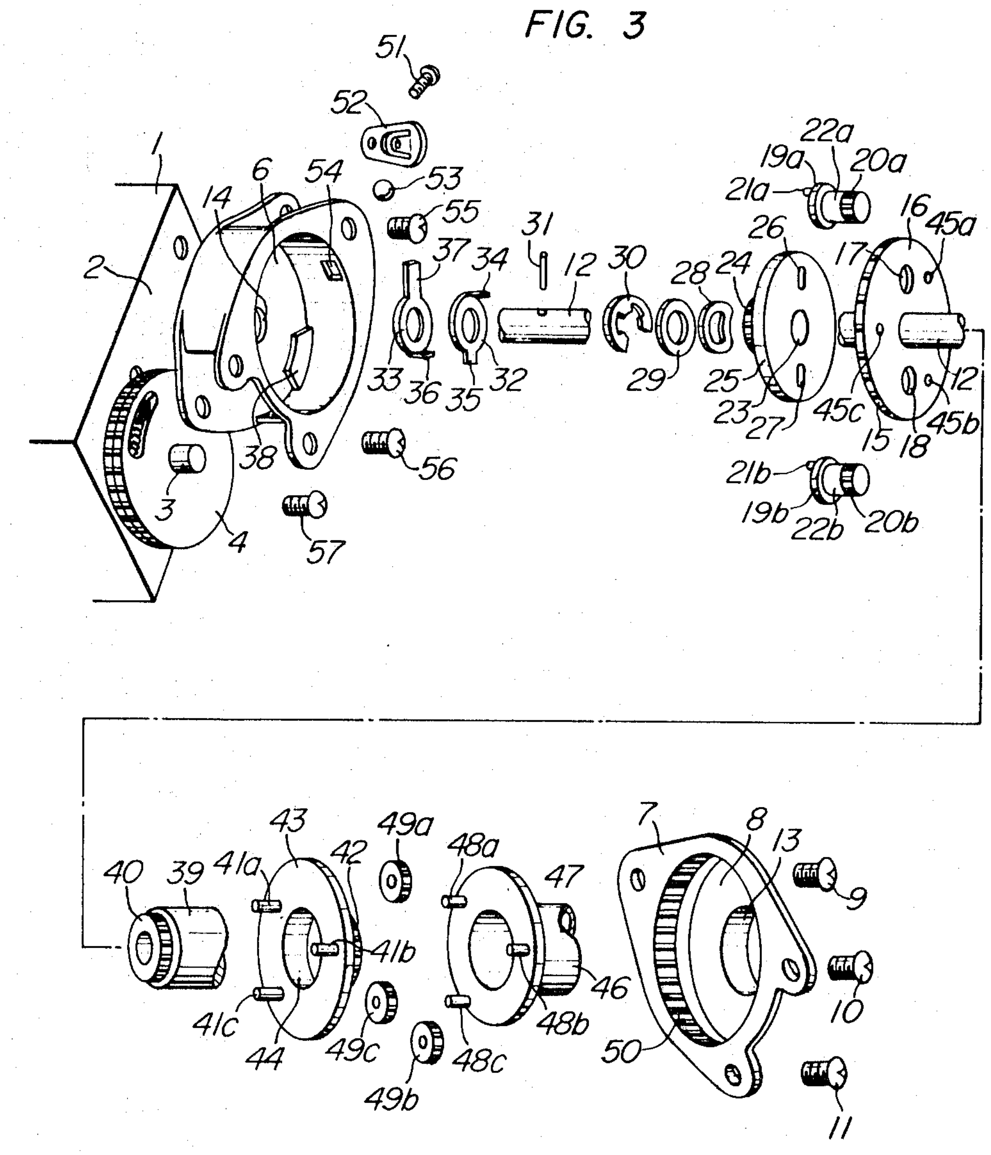
FIG. 3 is an exploded perspective view showing component parts constituting the torque transmitting mechanism of the tuner of FIG. 1.

Referring now to the drawings, throughout which like parts are designated by like reference numerals and symbols, numeral 1 designates a UHF tuner proper having a rotor shaft 3 extending through the front wall of the casing 2 of the tuner. The rotor shaft 3 is provided at its front end with a gear 4 secured thereto.

Secured by means of bolts 55, 56 and 57 to the front wall of the casing 2 is a rear housing half 5, which is in turn secured to a front housing half 7 by means bolts 9, 10 and 11.

Rotatably supported in the housing halves 5 and 7 is a main switch-over shaft extending through the central bearing holes 14 and 15 formed in the respective housing halves 5 and 7.

The main switch-over shaft 12 is provided at its intermediate position corresponding to the border between the housing halves 5 and 7 with a disk 16, which is secured to and rotates with the main switch-over shaft 12 and is formed with peripheral notches or indentations 15.

The disk 16 is also formed with symmetric holes 17 and 18, in which loosely engaged respective coupling members **22*a* and 22*b* respectively geared portions 20*a* and 20*b* and integral with disks 19*a* and 19*b* are provided with eccentric pins 21*a* and 21*b***.

The pins **21*a* and 21*b* of the coupling members 22*a* and 22*b* are inserted in respective holes 26 and 27 symmetrically formed in a member 25 having an integral pinion 24 mounted on the main switch-over shaft 12**.

The member 25 is pressed against the cam disk 16 by a bent washer 28, a washer 29 and a snap ring 30. The pinion 24 of the member 25 meshes with the gear 4 of the rotor shaft 3, so that by the rotation of the main switch-over shaft 12 the member 25 is rotated through the disk 16 and the pins **21*a* and 21*b* of the coupling members 22*a* and 22*b* to rotate the rotor shaft 3** so as to effect the switching of channels.

As the main switch-over shaft 12 is rotated, a stopper pin 31 provided on the main switch-over shaft 12 engages an axially bent portion 34 of a stopper member 32, which is fitted on the main switch-over shaft 12 and whose radially extending portion 35 in turn engages an axially bent portion 36 of another stopper member 33 also fitted on the main switch-over shaft 12. A radially extending portion 37 of the stopper member 33 engages a projected portion 38 of the rear housing half 5, as the main switch-over shaft 12 rotates, to restrict the rotation of the main switch-over shaft 12.

On the main switch-over shaft 12 is mounted a fine adjustment sleeve 39 having a gear portion 40 at its rear end, which enmeshes with the gears **20*a* and 20*b* of the coupling members 22*a* and 22*b* extending through the openings 17 and 18 of the disk 16**.

By the rotation of the fine adjustment sleeve 39 the coupling members **22*a* and 22*b* are rotated to rotate the member 25 through the pins 21*a* and 21*b* of the coupling members 22*a* and 22*b* engaging in the respective openings 26 and 27 of the member 25**, so that the fine adjustment may be effected.

On the fine adjustment sleeve 39 is mounted an annular coupling member 43 provided on its rear side with axial pins **41*a*, 41*b* and 41*c* and on its front side with an integral concentric gear 42. The pins 41*a*, 41*b* and 41*c* of the coupling member 43 are engaged in respective small openings 45*a*, 45*b* and 45*c* formed in the disk 16**.

On the fine adjustment sleeve 39 is also mounted a channel indicator sleeve 46 extending through the front housing half 7 and provided at its rear end within the housing 5 and 7 with an integral flange 47, which is provided with axial pins **48*a*, 48*b* and 48*c* rotatably supporting respective planet gears 49***a*, 49*b* and 49*c* meshing with both the gear 42 of the coupling member 43 and an internal gear 50 formed in the front housing half 7.

Thus, by the rotation of the main switch-over shaft 12 the coupling member 43 rotates as a unit with the main switch-over shaft 12, while at the same time the indicator sleeve 46 is rotated at a reduced speed through the gear 42 of the coupling member 43 and the planet gears 49*a*, 49*b* and 49*c*.

Against the indented or notched periphery of the disk 16 is urged a ball 53 retained within an opening 54 formed in the rear housing half 5 by an urging plate spring 52 secured at its end remote from the ball 53 to the rear housing half 5 by a bolt 51. The presence of the ball 53 urged against the disk 16 provides a nodal character for the rotation of the main switch-over shaft 12, so that the main switchover shaft 12 can be rotated intermittently.

In the operation of the tuner above described, the main switch-over shaft 12 may be intermittently rotated step by step as the ball 53 is forced against successive notches or indentations 15 of the disk 16. By the intermittent rotation of the main switch-over shaft 12 the member 25 is intermittently driven through the disk 16 and the coupling members 22*a* and 22*b* to intermittently rotate the rotor shaft 3 through the gear 4 thereof, thus effecting successive switching-over of the channels.

The rotation of the main shaft 12 is accompanied by the rotation of the fine adjustment sleeve 39 attained through the coupling members 22*a* and 22*b*. The rotation of the main shaft 12 is also accompanied by the rotation of the indicator sleeve 46 at a reduced speed attained through planet gears 49*a*, 49*b* and 49*c* to effect the indication of successive channels.

In the above manner, a desired channel is selected. After a desired channel is selected, the fine adjustment sleeve 39 may be rotated for the fine adjustment of the television set. As the fine adjustment sleeve 39 rotates, the coupling members 22*a* and 22*b* are rotated to rotate the member 25 through the pins 21*a* and 21*b* of the coupling members 22*a* and 22*b* being engaged in the openings 26 and 27 of the member 25, so that fine adjustment may be achieved.

By the manipulation of the fine adjustment sleeve 39 the disk 16 is not rotated to cause no rotation of the indicator sleeve 39, so that the previous channel indication is maintained.

The rotation of the main switch-over shaft 12 is restricted as the radial extension 37 of the stopper member 33 engages the projected portion 38 of the rear housing half 5. The rotation of the fine adjustment sleeve 39 is possible only for a range corresponding to the range, over which the pins 21*a* and 21*b* of the coupling members 22*a* and 22*b* are movable within the respective openings 26 and 27 in the member 25, and it is restricted as the pins 21*a* and 21*b* engage the inner peripheries of the openings 26 and 27.

What is claimed is:

1. A UHF tuner comprising a main switch-over shaft to switch channels, a disk secured to said main switch-over shaft, a member operatively coupled with a rotor shaft, coupling means integrally having gears and pins eccentric with respect to said gears, and a fine adjustment sleeve mounted on said main switch-over shaft and provided at one end with a gear, wherein said coupling means extend through respective openings formed in said disk, said pins of said coupling means extend within respective openings formed in said member, and said gears of said coupling means mesh with said gear of said fine adjustment sleeve.

2. A UHF tuner according to claim 1, wherein the periphery of said disk is formed with radially spaced notches or indentations, against which a round member is urged so that said main switch-over shaft may be rotated intermittently for the switching of successive channels.

References Cited

UNITED STATES PATENTS

| | | | |
|---|---|---|---|
| 3,307,414 | 3/1967 | Naber et al. | 74—10.54 X |
| 3,529,478 | 9/1970 | Hayakawa | 74—10.8 X |

MILTON KAUFMAN, Primary Examiner

U.S. Cl. X.R.

74—10.52, 10.8